(12) United States Patent
Saad et al.

(10) Patent No.: US 11,435,907 B2
(45) Date of Patent: Sep. 6, 2022

(54) ENSURING DATA AUTHENTICITY USING NOTARY AS A SERVICE

(71) Applicant: EMC IP Holding Company LLC, Hopkinton, MA (US)

(72) Inventors: Yossef Saad, Ganei Tikva (IL); Radia J. Perlman, Redmond, WA (US); Charles William Kaufman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 440 days.

(21) Appl. No.: 16/455,320

(22) Filed: Jun. 27, 2019

(65) Prior Publication Data

US 2020/0409571 A1    Dec. 31, 2020

(51) Int. Cl.
*G06F 3/06* (2006.01)
*H04L 9/32* (2006.01)

(52) U.S. Cl.
CPC ............ *G06F 3/0622* (2013.01); *G06F 3/067* (2013.01); *G06F 3/0653* (2013.01); *H04L 9/3242* (2013.01); *H04L 9/3247* (2013.01)

(58) Field of Classification Search
CPC ...... G06F 3/0622; G06F 3/0653; G06F 3/067; G06F 3/06; H04L 9/3242; H04L 9/3247; H04L 9/32
See application file for complete search history.

(56) References Cited

U.S. PATENT DOCUMENTS

| | | | | |
|---|---|---|---|---|
| 2002/0166064 A1* | 11/2002 | Harrison | .......... | G11B 20/00094 726/10 |
| 2002/0194476 A1* | 12/2002 | Lewis | .................. | H04L 9/3247 713/169 |
| 2004/0193872 A1* | 9/2004 | Saarepera | ............... | G06F 21/64 713/156 |
| 2007/0049250 A1* | 3/2007 | Chambers | ........... | H04W 12/108 455/411 |
| 2013/0318357 A1* | 11/2013 | Abraham | .............. | G06F 21/565 713/176 |
| 2018/0145836 A1* | 5/2018 | Saur | .................... | G06Q 20/3829 |
| 2019/0020633 A1* | 1/2019 | Leavy | ................... | H04L 9/0841 |
| 2020/0125282 A1* | 4/2020 | Fisher | .................... | G06F 3/0632 |

* cited by examiner

*Primary Examiner* — Theodore C Parsons
*Assistant Examiner* — Howard H. Louie
(74) *Attorney, Agent, or Firm* — Workman Nydegger

(57) ABSTRACT

One example method includes accessing stored data, associating a unique identifier with the data, creating a hash by hashing a combination that comprises the unique identifier and the data, transmitting the hash to a notary service, receiving, from the notary service, a digital signature that corresponds to the hash, appending the digital signature to the data, and storing, as an object, a combination that comprises the digital signature, the data, and the unique identifier.

20 Claims, 6 Drawing Sheets

ENSURING DATA AUTHENTICITY USING NOTARY AS A SERVICE

FIELD OF THE INVENTION

Embodiments of the present invention generally relate to data authenticity. More particularly, at least some embodiments of the invention relate to systems, hardware, software, computer-readable media, and methods for verifying and demonstrating the authenticity of stored data.

BACKGROUND

Many users such as companies and organizations store data in object storage in the cloud, one example of which is the Amazon Simple Storage Service (S3) object storage. Such storage has become popular because it is cheaper than other types of storage, such as Elastic Block Storage (EBS) for example, and because object storage is well suited for storing large blocks of data. That is, every object can be written or read as a whole.

Some organizations, such as healthcare providers, could use object storage to store patient data such as X-ray images, MRI scans or other large files. The regulation in such industries require those organizations to store the data for a long period of time, 7 years or even more, and to take the appropriate measures to ensure that the data is unaltered and is exactly the same as it was when originally stored there.

Data authenticity in cases such as this is important. To illustrate, in a healthcare context, there may be a need to compare patient images from different times. If any of the compared data is inauthentic, whether because of an event that occurred at the cloud storage, or elsewhere, there is a possibility of an incorrect diagnosis, or a failure to detect a possibly life-threatening condition.

The aforementioned example implicates a number of trust issues. One such trust issue is that the medical service provider must be able to prove to a regulator that the medical service provider kept the authentic patient data unaltered. As another example, the cloud provider may need to be able to prove to the medical service provider that the medical service provider data was kept safely at the cloud and was not corrupted. Thus, what is needed are methods to resolve these and/or other problems relating to data authenticity.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
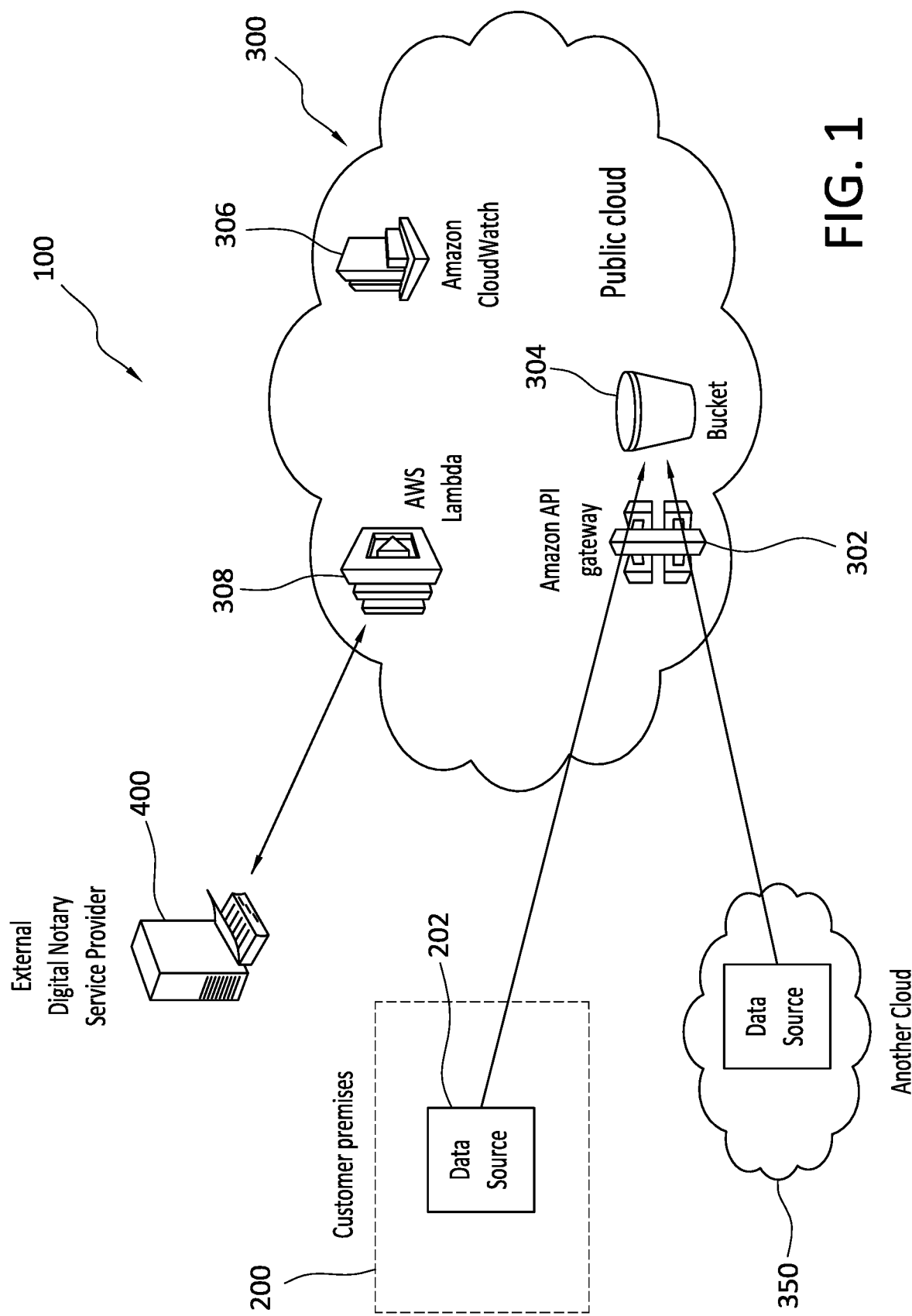
FIG. 1 discloses aspects of an example architecture and environment for some embodiments of the invention.

Embodiments of the present invention generally relate to data authenticity. More particularly, at least some embodiments of the invention relate to systems, hardware, software, computer-readable media, and methods for verifying and demonstrating the authenticity of stored data.

In at least some example embodiments, digital signatures created by a trusted entity are used to prove data authenticity. Otherwise, the signer would be capable of modifying the data and creating a new signature, including changing the timestamp of the data. Also, if the only copy of the signature is in the same place as the data, a malicious cloud that is storing both the signature and the data can delete it, claiming that it never received the data.

In cases where the cloud storage is responsible for maintaining the authenticity of stored data, the cloud has to acknowledge, and demonstrate, that the hash of the data, which has been signed by the user and/or the notary, is indeed the hash of the data it received. As well, it is possible, especially in long-term archiving of data, that the user would want to move the data from one cloud to another, maybe even several times. If the data is corrupted, embodiments of the invention can detect the corruption, and also trace the corruption to its source so that the cloud provider, or other entity, at fault can be identified.

In general, example embodiments of the invention provide and/or enable a third party, which may be referred to herein as a "Notary Service Provider" (NSP), or simply a "notary service," to be the registrar of objects for the user, and attest to the authenticity of such copies to the appropriate authority, to the users themselves, and/or to the cloud storage providers. To save the user cloud resources and to simplify the implementation, this mechanism is implemented using Function as a Service (FaaS) in some embodiments, although this FaaS approach is not necessarily required in all cases. As used herein, FaaS embraces a category of cloud computing services that provides a platform allowing customers to develop, run, and manage application functionalities without the complexity of building and maintaining the infrastructure typically associated with developing and launching an app.

For the purposes of this disclosure, the concept of FaaS is that an action, such as insertion of an object within an object store for example, triggers a function call, which in turn can trigger different actions which also trigger functions. The FaaS platform handles the provisioning of these functions, so the user does not need to set up compute instances (EC2), associated block storage devices (EBS), maintain operating system or install applications. As well, the user pays for the compute resources only for the duration the function is running, and not all the time as is typically the case with non-FaaS approaches.

As evidenced by the foregoing, and the rest of this disclosure, example embodiments of the invention can provide verified authenticity of data. Such functionality can help to resolve, or avoid, situations where, for example, a user is storing data in a cloud object storage, for the first time or when the object is moved between clouds, and the user cannot prove to a third party, such as a regulator, that the data has not been changed. As well, such functionality is also useful in providing an impartial identification of a change to data, as may be employed when there is a need to determine the liability, or lack thereof, of a cloud storage provider with respect to certain data stored in the cloud storage.

Advantageously then, example embodiments can be effectively employed in circumstances where, for example, a user creates data and wants to store the data in a cloud storage site, and the cloud storage entity is contractually obligated to keep the data, and provide it, unaltered, when the user requests it. As well, the cloud storage entity would like to be able to prevent, such as by rebuttal, the user from claiming that the user sent data, and then blaming the cloud storage entity when the data is not at the cloud storage entity. Further, the user would like to be able to prevent the cloud storage entity from losing the data, and then claiming that it never received the user data. Finally, the user would like to be able to prove to a disinterested third party that the data existed at a specific point in the past, and has not been modified. Example embodiments can provide these, and other, functionalities.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Architecture and Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data generation, data processing, and data management, operations. Such data management operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments can be stored in a data protection environment that may take the form of a public or private cloud storage site, an on-premises storage environment, and hybrid storage environments that include public and private elements. Any of these example storage environments, may be partly, or completely, virtualized. The storage environment may comprise, or consist of, a datacenter which is operable to service read and write operations initiated by one or more clients. Any entity, or group of entities, that generates new and/or modified data, and performs read and write operations, may be referred to generally herein as a data source.

Thus, in addition to the storage environment, the operating environment may also include one or more data sources, such as clients for example, that are capable of collecting, modify, and creating, data. As such, a particular client may employ, or otherwise be associated with, one or more instances of each of one or more applications that perform such operations with respect to data.

Devices in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With particular attention now to FIG. 1, one example of an architecture for embodiments of the invention is denoted generally at 100. In general, the architecture 100 may include a customer premises 200 with one or more data sources 202 that can operate to generate, collect, read, write, and modify, data. By way of illustration, one or more of the data sources 202 can be a client that hosts one or more applications that operate to generate, collect, read, write, and modify, data. Such data may be referred to herein as client data, or customer data.

The data generated by one or more of the data sources 202 can be stored in a cloud storage environment, one example of which is the cloud storage site 300. Among other things, the cloud storage site 300 embraces any system and/or components operable to store data and respond to read, write, and delete, requests.

The cloud storage site 300 may be physically remote from the customer premises 200 and can be a public cloud, private cloud, or a hybrid public/private cloud. The cloud storage site 300 may, in some embodiments, consist of, or comprise, the Amazon S3 cloud storage platform. No particular type of cloud storage site 300 is required, but in at least some embodiments, the cloud storage site 300 provides object storage functionality. The data generated by the data sources 202 and stored in the cloud storage site 300 may be encrypted prior to transmission between the data sources 202 and the cloud storage site 300. In at least some embodiments, data from the data sources 202 is encrypted, at the customer premises 200 for example, prior to storage in the cloud storage site 300.

The data sources 202 and cloud premises 200 may communicate with the cloud storage site 300 by way of a gateway 302 which, in some example embodiments, can take the form of an Amazon API (application program interface) gateway. For example, data transmitted to, and received from, the cloud storage site 300 may pass through the gateway 302. In general, a cloud storage site to which data is transmitted for storage may be referred to herein as a target cloud.

When data is received at the cloud storage site 300 by way of the gateway 302, the data can be stored in one or more buckets 304. The bucket(s) 304 in which data is stored can be in existence prior to receipt of the data at the cloud storage site 300, or can be created in response to receipt of the data at the cloud storage site 300. When a new bucket 304 is created, and/or when data from a data source 202 is stored in an existing bucket 304, a watch service 306, such as the Amazon CloudWatch service for example, can detect the creation of a new bucket 304, and/or the storage of data in an existing bucket 304.

Detection of the creation of a new bucket 304 and/or the storage of data in an existing bucket can operate as a trigger for invocation of one or more compute services 308, such as AWS Lambda for example. In general, the AWS Lambda compute service enables a user to run user code without the need for the user to provision or manage servers or other resources that would otherwise be needed to run the code. That is, the user code can be run in the cloud storage site 300, using resources located in the cloud storage site 300. In this way, the user does not have to provide or manage its own resources to run the code. The compute service 308 can be used to run any user code relating to user data stored, or targeted to be stored, in the cloud storage site 300. As well, the compute service 308 only executes the user code when needed and scales automatically, for example, from a few code run requests per day to thousands of code run requests per second. Advantageously, the user pays only for compute time consumed, and no charges are incurred when the user code is not running.

In example embodiments, the user code that is executed by the compute service 308 comprises code which, in general, generates and attaches a globally unique identifier to user data stored in the bucket 304, and then calculates a hash code for the data+identifier combination. The hash code is then provided by the compute service 308 to an external digital notary service provider 400, which may be referred to herein simply as a 'notary' or 'notary service.' In general, and as disclosed in more detail elsewhere herein, the notary service 400 operates to ensure the authenticity of data stored at, and/or retrieved from, the cloud storage site 300 and/or one or more other cloud storage sites 350. This may be done by way of a digital signature that is applied to the hash. While not specifically indicated in FIG. 1, the notary service 400 can also communicate with the cloud storage sites 350, each of which, in terms of their configuration and operation, can be similar or identical to the cloud storage site 300. Finally, the notary service 400 may provide, or access, a public key—private key pair, where the public key is published for use by the function(s) implemented by the compute service 308, and the private key is retained as private at the notary service 400. As discussed herein, the public/private key pair is used for the authentication process. Other forms of asymmetric encryption may alternatively be employed. The notary service 400 may come into play in various circumstances, such as when someone claims the signed document does not exist. At that point, the database of the notary may be checked to see that some document with a specified identifier was indeed signed at some point in the past. The notary would not have a copy of the document, but would have a record that a document with some user id (UID) was signed with a digital signature. Thus, in this example, the client would be the one to check the notary database, and then only in the case where the retrieval of the document by the client has failed. With these points in view, following is a brief discussion of some aspects of encryption, decryption, digital signing, and verification processes that may be implemented in connection with embodiments of the invention.

In general, public key cryptography has two kinds of keys and four kinds of operations. A key can either be a public key or a private key. As noted above, the keys are created in pairs, so there is each private key has a corresponding public key. The four operations are encryption, decryption, signing, and verification. The public key is intended to be known to everyone, while the private key is intended to be known only to the key's "owner," that is, the entity that created the pair of keys. Encryption and verification are performed using the public key, since anyone should be able to encrypt a message for an entity and anyone should be able to verify the signature of that entity. Decryption and signing are done using the private key, since only the key owner should be able to do those things.

Various types of public key algorithms can be employed in connection with embodiments of the invention, one example of which is RSA. Another public key algorithm that may be used in connection with embodiments of the invention is Elliptic Curve Cryptography (ECC). With the RSA algorithm only, the mathematical operation performed for signing is the same as the mathematical operation for decryption, and the mathematical operation performed for encryption is the same as the mathematical operation for signature verification.

In general, a digital signature is an authentication mechanism that enables the creator of the message to attach a code, to a message, hash, or other information, that acts as a signature. An example digital signature scheme may include three elements. These three elements include: (i) a key generation algorithm that selects a private key uniformly at random from a set of possible private keys—this algorithm outputs the private key and a corresponding public key; (ii) a signing algorithm that, given a combination of a message and a private key, produces a signature; and (iii) a signature verifying algorithm that, given the message, public key and signature, either accepts or rejects the message claim to authenticity. The digital signature scheme thus ensures that the authenticity of a signature generated from a combination of a fixed message and fixed private key can be verified by using the corresponding public key.

Signature verification may be performed differently, depending upon the key generation scheme employed. Thus, in the case of RSA, signature verification is performed by extracting the hash from the signature using a decryption method. This process is sometimes referred to as signature verification with data recovery. On the other hand, ECC does not employ such a process. Instead, the hash must be known and then fed into an algorithm that verifies the signature. In either case, processes may be performed, or not, depending upon the success or failure in verifying the signature.

B. Example Host and Server Configurations

Figure 2:
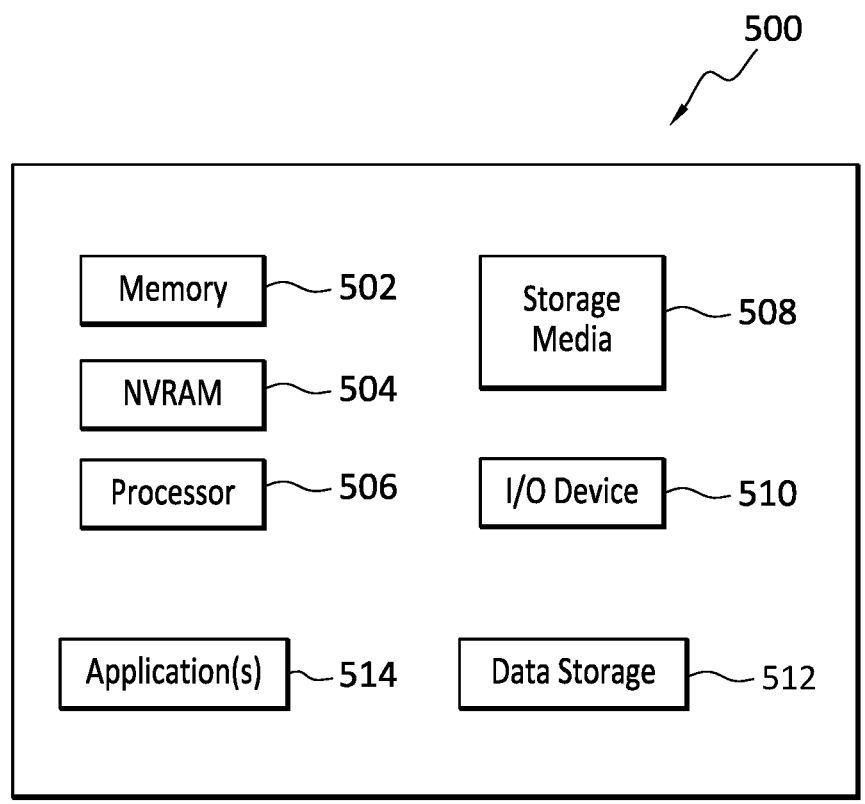
FIG. 2 discloses aspects of an example host configuration.

With reference briefly now to FIG. 2, any one or more of the customer premises 200, data sources 202, cloud storage site 300, API gateway 302, buckets 304, watch service 306, compute service 308, and notary service 400, can take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 2.

In the example of FIG. 2, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, I/O device 510, and data storage 512. One or more of the memory components 502 of the physical computing device 500 can take the form of solid state device (SSD) storage. As well, one or more applications 514 are provided that comprise executable instructions.

Such executable instructions can take various forms including, for example, instructions executable to perform any method or portion thereof disclosed herein, and/or executable by/at any of a storage site, whether on-premises at an enterprise, or a cloud storage site, client, datacenter, backup server, blockchain network, or blockchain network node, to perform any of the functions disclosed herein. As well, such instructions may be executable to perform any of the other operations disclosed herein including, but not limited to, data collection, data processing including data analysis, data read/write/delete operations, instantiation of one or more applications, any process involving establishing and/or determining data authenticity, and any process(es) performed by, and/or at the direction of, a notary service.

C. Example Methods and Object Formats

Figure 3:
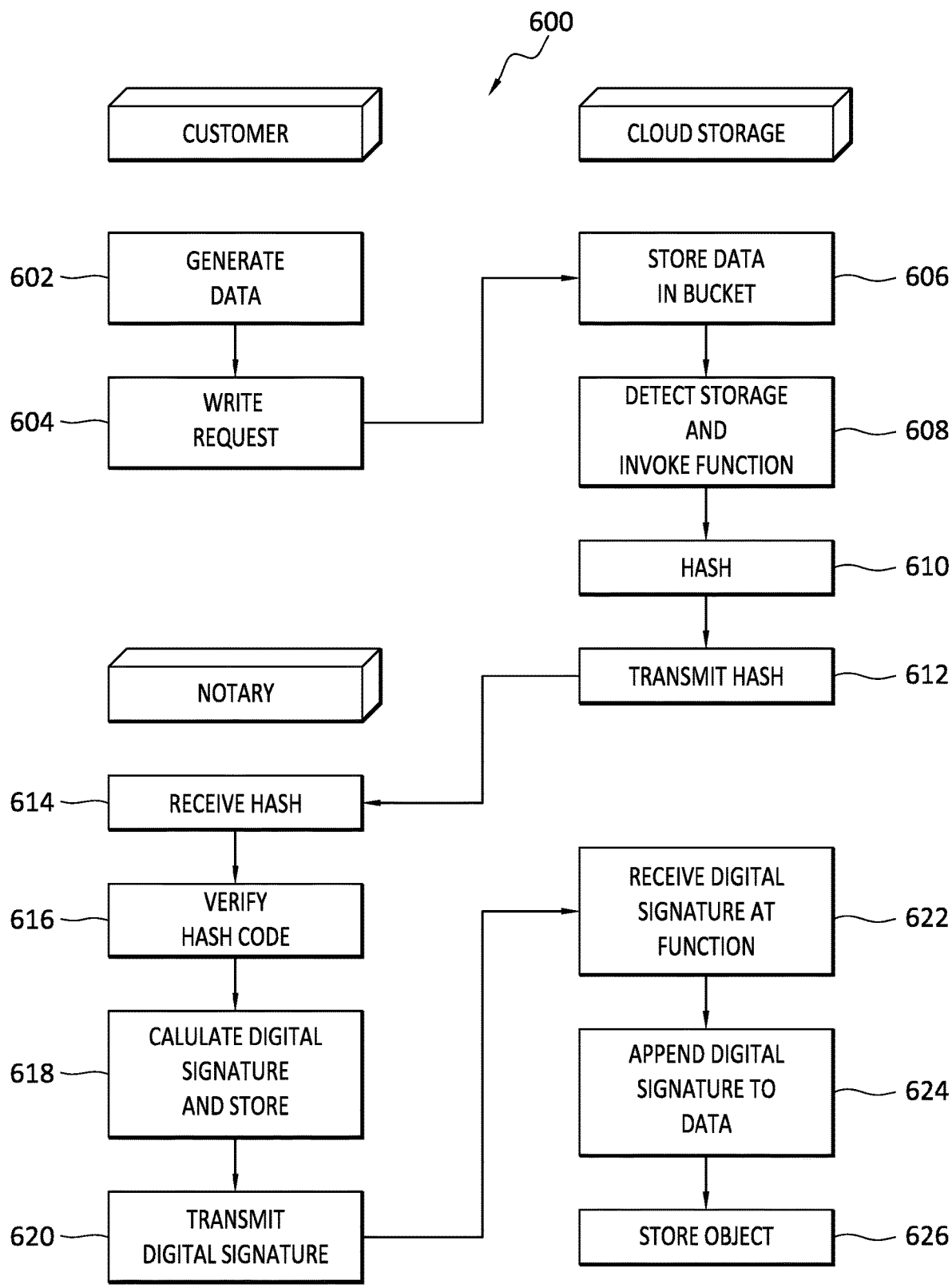
FIG. 3 discloses aspects of some example methods.

Directing attention now to FIG. 3, aspects of some methods for storing data in a form, and manner, that permit authentication of the data by a notary service, where one particular example method is denoted generally at 600. As indicated in FIG. 3, various aspects of the method 600 are performed by one of a user, a cloud storage site, and a notary service. However, the functional allocation disclosed in FIG. 3 is provided only by way of example, and the disclosed functions may be distributed among the aforementioned and/or other entities disclosed herein, in other ways. As such, the scope of the invention is not limited to the functions, or functional allocation, disclosed in FIG. 3. Finally, it will be appreciated that the respective sets of functions performed by the user, cloud storage site, and notary service, may each define a separate respective method.

The method 600 can begin when a data source generates 602 new and/or modified data that is desired to be stored, such as off-premises at a cloud storage site. Accordingly, the data source and/or other element of a customer premises may generate and transmit 604 a write request or, as discussed below, a read request in some instances. The write request and associated data are received at the cloud storage site and stored 606, such as in one or more buckets for example.

The storage of the data at the cloud storage site is detected 608, such as by a watch service for example, and such detection triggers the invocation 608 of a function to be performed with respect to the stored data. In some examples, the watch service takes the form of the CloudWatch service, which is configured to detect any new bucket written into this bucket/account and invoke the function, which may be implemented in the manner of a Function as a Service (FaaS), that will perform various processes with respect to the stored data.

For example, invocation of the function 608 may comprise, or cause, performance of the following operations. Initially, the stored data will be read by the function. The function adds, to the data, a header that is a globally unique identifier of the object. One possible header format could include the following elements: cloud name, such as AWS for example; the user account name, the object key; the object version and date/time the object was stored. An illustrative example of such a header could be:

AWS-<accountname>-images/x-ray/JohnSmith12345678-12AUG2019.

After the header has been created, the function then calculates a hash code 610 for the identifier+data combination using a mechanism that is similar, or identical, to the one used by the cloud provider, such as a base-64 encoded 128-bit MD5 digest for AWS for example. Alternatively, the SHA-1 hash algorithm, or other suitable algorithm, can be used to calculate the hash code. The hash code, which is a representation of the identifier+data combination, is stored at the cloud storage site in association with the identifier+data combination. As well, the hash code is also transmitted by the function to the notary service 612. Advantageously, the hash code is small in size, relative to the identifier+data combination that it represents, and thus requires little storage space and compute resources.

The notary service then receives 614 the hash code, accesses the cloud storage site console, such as by way of one or more APIs, and verifies 616 that the hash code provided by the function is the same as the hash code that is stored in the cloud storage site records, to ensure that the two hash codes are in agreement, that is, that the hash codes match. If the two hash codes match, then the hash code received by the notary service from the function is stored at the notary service. If the hash codes do not match, the notary service may transmit a message to the cloud storage site and/or to the function and/or the customer who owns the data source 602 indicating that the hash codes do not match. In some embodiments, the hash code received at the notary service from the cloud storage site is only stored at the notary service if that hash code matches the hash code that is stored at the cloud storage site.

In connection with the foregoing, it is noted that the hash code that is stored in the cloud storage site records may be generated by the cloud storage site when, for example, the associated data is received at the cloud storage site for storage. In this way, the cloud storage site is able to represent a relatively large object in its log records by a short string, that is, the hash code. In order for the hash comparison 616 to be effective, the cloud storage site and the function should each use the same hash algorithm.

By comparing the hashes 616, a determination is made as to whether the data stored in the cloud storage site is the same as the data that is represented by the hash code that is stored at the notary service, that is, the hash code generated by the function. That is, the notary service can verify that the object data has been written to the cloud storage site, and that the object data has not been forged by the customer. Moreover, it is not necessary that the actual data be stored at the notary service. Rather, it is enough to simply store, at the notary service, the hash code that represents that data.

After the hash codes have been compared 616, and a determination made that the hash codes match, the notary service then uses its private key to calculate a digital signature 618 to associate with the hash. That is, creation of the digital signature 618 is based on the hash and the private key. The notary service then sends 620 the digital signature back to the function, which appends the digital signature to the tail of the data and the result is stored in the object. An example format of an object is disclosed in FIG. 4.

Before, or after, the notary service sends 620 the digital signature to the function, the notary service also stores the digital signature locally in a key-value database of the notary service, where the unique identifier is the key, and the hash and the digital signature are the values. Thus, the notary service creates and maintains a record of transactions involving data stored at the cloud storage site.

Figure 4:
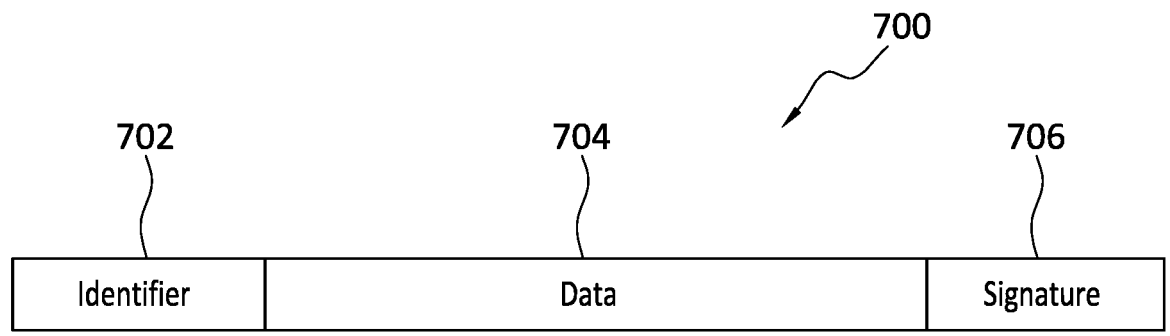
FIG. 4 discloses an example object format for a data object.

An example of an associated object format 700 for a data object is disclosed in FIG. 4, where it can be seen that header 702, which is an example of a unique identifier, is associated with the data 704. As well, a digital signature 706 is appended to the data 704. As noted herein, the digital signature 706 may be created only by the notary based on a combination of the private key+the hash of the identifier+data combination.

With continued reference now to FIG. 3, after the digital signature has been transmitted 620 from the notary service, the digital signature is received by the function 622 at the cloud storage site. The function then appends 624 that digital signature to the data, and stores 626 the digital signature+data, that is, the object, in a bucket at the cloud storage site.

Figure 5:
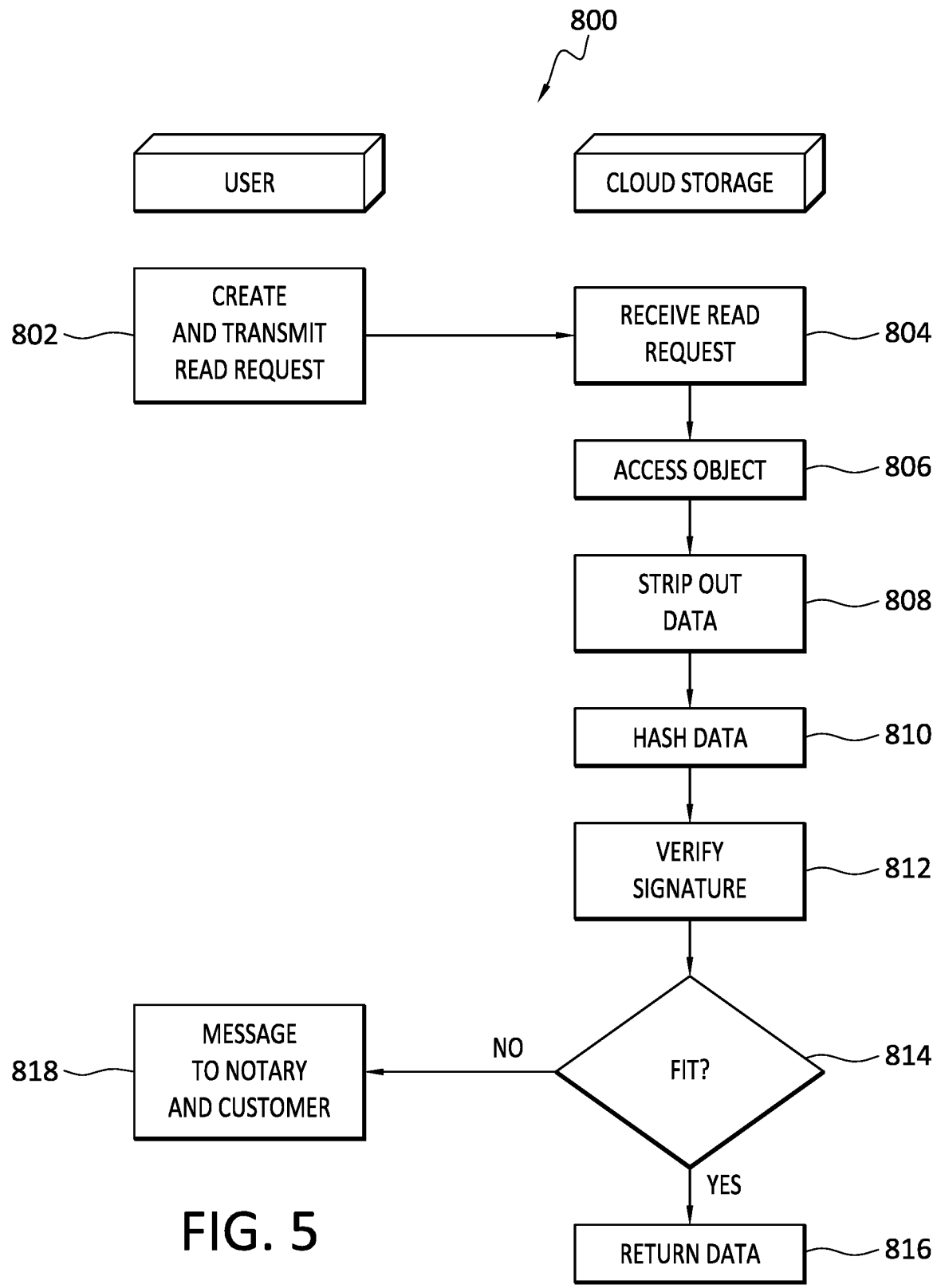
FIG. 5 discloses aspects of another example method.

Turning now to FIG. 5, details are provided concerning aspects of an example method for reading data which is susceptible of authentication. One particular example method is denoted generally at 800. The method 800 can begin when a user at a customer site creates and transmits a read request 802 for data stored at a cloud storage site. The read request is then received 804 at the cloud storage site.

The cloud storage site then accesses 806 a stored object that includes data specified in the read request. As noted herein, the object may include a digital signature appended to a data+identifier combination. The data of the object is stripped out 808 from the identifier and the digital signature, and then hashed 810. This process is performed because while the digital signature was created based in part on the hash, the data, not the hash, is stored in the object store with the digital signature. Therefore, the hash is calculated 810 in order to enable verification 812 of the digital signature.

After the hash is calculated 810, the digital signature of the object that was read out is then evaluated, by application of the public key to the digital signature, to verify 812 whether or not the digital signature fits with the hash that was calculated 810. If the digital signature is determined 814 to fit with the hash that was calculated 810, then it can be concluded that the digital signature that was read out is valid and, correspondingly, that the data to which the digital signature was appended is authentic. In this way, the cloud storage site can prove, to the notary service and/or to the customer, that the stored data matches the data to which the digital signature was appended.

Thus, if it is determined 814 that the digital signature fits with the hash, then the data specified in the read request is returned 816 from the cloud storage site to the customer. On the other hand, if it is determined 814 that the digital signature does not fit with the hash, then an alert is sent 818 to the customer and to the notary service. The alert 818 can be used as a basis for triggering an audit, investigation, or other process to determine, for example, when/where/why/how the problem occurred that resulted in the mismatch between the compared hashes. As well, even if it is determined 814 that the digital signature does not fit with the hash, the requested data can still be returned to the customer.

With respect to verification of the digital signature, as discussed in connection with FIG. 5 and elsewhere herein, such verification need not necessarily take place at, or be performed by, the cloud storage site. For example, in some instances, digital signature verification can be performed by the application that is reading out, or will read out, the data from storage. In some embodiments, digital signature verification may be omitted unless a dispute arises as to the authenticity of the data stored at the storage site, in which case digital signature verification may be performed. Some embodiments provide that the cloud storage site performs digital signature verification only on request, such as by an application, the notary service, and/or other entities. Such a request for digital signature verification could, for example, be included as part of a read request issued by an application, or other entity.

D. Multi-Cloud Operations

In some example embodiments, operations such as write and read operations, may involve multiple cloud storage sites. These cloud storage sites may, or may not, be similar or identical to each other in terms of their configuration and/or functionality. More specifically, rather than writing data to a particular cloud storage site, the customer may choose to move data from a first cloud storage site to a second cloud storage site. That is, the data stored at the first cloud storage site is written to the second cloud storage site.

In general, this write process can be the same as disclosed in FIG. 3, except that instead of using raw data for the basis of calculations performed by the function and the notary service, a modified object is used instead for those calculations. That is, the unique identifier metadata and digital signature metadata of the object format, discussed below, that is used in the second cloud storage entity is different from the unique identifier metadata and digital signature metadata employed in the first cloud storage entity, but the underlying data of the respective objects stored in each of the cloud storage entities is the same.

As well, the read process in the multi-cloud scenario can be the same as the read process of FIG. 5, except that, in the multi-cloud scenario, the underlying data itself is not authenticated by that read process. Rather, what is authenticated in the multi-cloud read process scenario is that the object, an example of which is disclosed in FIG. 4, that was received by the second cloud storage site is the same as the object that was stored at the first cloud storage site. Thus, like the cloud storage site in the example of FIG. 5, the second cloud storage site and associated functions also avail themselves of the notary service to provide authentication.

Figure 6:
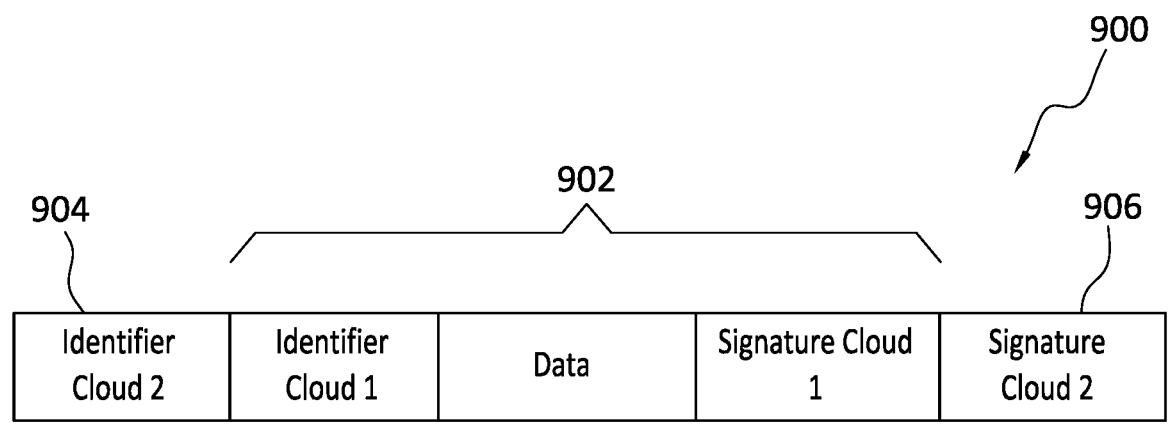
FIG. 6 discloses another example object format.

With reference now to FIG. 6, details are provided concerning an example object format 900 that may be used in a multi-cloud scenario. As indicated, the object 900 may include, as data 902, an object which can take the form of the object 700 discussed in connection with FIG. 4. As well, the object 900 can include a unique identifier 904 such as Identifier Cloud 2 for example. In this way, a data 902+identifier 904 combination is defined. Further, the object 900 may include a digital signature, such as Signature Cloud 2 for example. Similar to the case of the digital signature 706, the digital signature 906 can be created by encrypting a hash of the identifier 904 and data 902. Thus, when the digital signature 906 is decrypted, the resulting hash should match a hash of the identifier 904+data 902, that is, the object that was written from the first cloud storage site to the second cloud storage site. In this way, a determination can be made as to whether the data 902 stored at the second cloud storage site matches the object, such as object 700, that was initially stored at the first cloud storage site.

E. Further Aspects of Some Example Embodiments

It will be appreciated that various additional features and elements can be included in one or more embodiments of the invention. For example, some embodiments provide for a dispute resolution functionality. To implement dispute resolution, the notary service must be trusted by the user, the cloud, and any 3rd party that needs to ensure the data is authentic. There are various ways this could be done.

For example, all three of the customer, the notary, and the cloud storage site can sign the data with a respective digital signature, which can be created as disclosed herein. Alternatively, the cloud storage site and the customer each must let the notary service know that they agree that the data has a particular hash, and then the notary can sign it. If the only copy of the data is in the cloud, then the signature of the notary service must additionally be kept in a separate place where the cloud storage site cannot access or delete that signature. This is an additional service that the notary service can provide, namely, keeping records of data that it has signed.

Finally, as disclosed herein, embodiments of the invention can provide a variety of useful functions and services. For example, the notary service ensures that the cloud storage site acknowledges receipt of the data before the notary service will attach a signature to the data. As another example, the notary service, or the user in a different location from the data, keeps the signature. In a further example, software such as the functions disclosed herein, and a set of cloud scripts and configurations that can be deployed in the cloud, and automatically detect, sign and store in a modified mode, that is, with the signature, any object that is being stored in the cloud using the standard protocol such as Amazon S3 without the need for the customer/user/application to do anything different from their standard mode of operation, such as using standard object commands such as "PUT," for example. In fact, the customer/user/applicant need not even be aware of processes for signing and storing the data.

F. Some Further Example Embodiments

Below are listed some particular example embodiments. As will be apparent, such embodiments include various technical features that can be effective in resolving technical problems, examples of which are disclosed herein. One such technical problem that may be resolved by one or more embodiments of the invention concerns the present inability of a cloud storage entity to establish, to the satisfaction of a notary service, customer, and/or other entities, that data stored at the cloud storage site is authentic, that is, the data has not been compromised, or deleted. It will be apparent from this disclosure that various other technical problems may be resolved by one or more of the disclosed embodiments.

Embodiment 1. A non-transitory storage medium having stored therein instructions that are executable by one or more hardware processors to perform operations comprising: accessing stored data; associating a unique identifier with the data; creating a hash by hashing a combination that comprises the unique identifier and the data; transmitting the hash to a notary service; receiving, from the notary service, a digital signature that corresponds to the hash; appending the digital signature to the data; and storing, as an object, a combination that comprises the digital signature, the data, and the unique identifier.

Embodiment 2. The non-transitory storage medium as recited in embodiment 1, wherein the object header comprises a unique identifier.

Embodiment 3. The non-transitory storage medium as recited in embodiment 1, wherein the digital signature is based on the hash and a private key.

Embodiment 4. The non-transitory storage medium as recited in embodiment 1, wherein the hash includes a timestamp.

Embodiment 5. The non-transitory storage medium as recited in embodiment 1, wherein the data whose storage is detected is received from a customer and/or from a cloud storage entity.

Embodiment 6. The non-transitory storage medium as recited in embodiment 1, wherein the operations are performed at a cloud storage entity.

Embodiment 7. The non-transitory storage medium as recited in embodiment 1, wherein the operations further comprise storing the hash in association with the data.

Embodiment 8. The non-transitory storage medium as recited in embodiment 1, wherein the operations further comprise detecting, by a watch service, storage of the data and, in response to the detection, invoking, by the watch service, a function that performs some of the operations.

Embodiment 9. The non-transitory storage medium as recited in embodiment 1, wherein the operations further comprise detecting, by a watch service, storage of the data and, in response to the detection, invoking, by the watch service, a function that is run by a compute service and that performs some of the operations.

Embodiment 10. The non-transitory storage medium as recited in embodiment 1, wherein the operations further comprise detecting, by a watch service, storage of the data and, in response to the detection, invoking, by the watch service, a function that performs any one or more of the operations: accessing stored data; associating the unique identifier with the data; creating the hash by hashing the combination that comprises the unique identifier and the data; and, transmitting the hash to the notary service.

Embodiment 11. The non-transitory storage medium as recited in embodiment 1, wherein the object further comprises a second unique identifier and a second digital signature, and the second unique identifier and second digital signature correspond to a second cloud storage site different from a first cloud storage site to which the digital signature and the unique identifier correspond.

Embodiment 12. A non-transitory storage medium having stored therein instructions that are executable by one or more hardware processors to perform operations comprising: receiving a read request that identifies data to be read out; accessing an object associated with the data, the object comprising a combination of data, a digital signature, and a unique identifier; stripping the data from the unique identifier and the digital signature; hashing the data to generate a hash; verifying the digital signature with a public key by determining whether or not the digital signature fits with the hash, and either: returning the requested data when the digital signature fits with the hash; or notifying a customer and/or a notary service when the digital signature does not fit with the hash.

Embodiment 13. The non-transitory storage medium as recited in embodiment 12, wherein the digital signature is based on the hash and a private key.

Embodiment 14. The non-transitory storage medium as recited in embodiment 12, wherein the hash includes a timestamp.

Embodiment 15. The non-transitory storage medium as recited in embodiment 12, wherein the operations are performed at a cloud storage entity.

Embodiment 16. The non-transitory storage medium as recited in embodiment 12, wherein the data of the object is authenticated when it is determined that the digital signature fits with the hash and the data of the object is not authenticated when it is determined that the digital signature does not fit with the hash.

Embodiment 17. The non-transitory storage medium as recited in embodiment 12, wherein any one or more of the operations are performed by a function that is run by a compute service at a cloud storage entity.

Embodiment 18. The non-transitory storage medium as recited in embodiment 12, wherein the object further comprises a second unique identifier and a second digital signature.

Embodiment 19. The non-transitory storage medium as recited in embodiment 12, wherein the digital signature fits with the hash, and the operations further comprise notifying a third party that the data of the object has been authenticated.

Embodiment 20. The non-transitory storage medium as recited in embodiment 12, wherein the digital signature does not fit with the hash, and the operations further comprise notifying a third party that the data of the object has not been authenticated.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors to perform operations comprising:
   detecting, at a cloud storage site, storage of data at the cloud storage site;
   in response to the detecting of the storage of the data, invoking, at the cloud storage site, a function that operates at the cloud storage site by:
      accessing the data;
      generating and adding, to the data, a header that comprises a globally unique identifier of the data;
      creating a hash by hashing a combination that comprises the globally unique identifier and the data;
      transmitting the hash to a notary service;
      when the hash is authenticated by the notary service, receiving, from the notary service, a digital signature that corresponds to the hash; and
      appending the digital signature to the data; and
   storing at the cloud storage site, as an object, a combination that comprises the digital signature, the data, and the globally unique identifier.

2. The non-transitory storage medium as recited in claim 1, wherein when the hash is not authenticated by the notary service, the function receives a message from the notary service indicating that the hash is not authenticated.

3. The non-transitory storage medium as recited in claim 1, wherein the digital signature is based on the hash and a private key.

4. The non-transitory storage medium as recited in claim 1, wherein the hash includes a timestamp.

5. The non-transitory storage medium as recited in claim 1, wherein the data whose storage is detected is received from a customer and/or from a cloud storage entity.

6. The non-transitory storage medium as recited in claim 1, wherein the function is invoked automatically in response to the detecting of the storage of the data at the cloud storage site.

7. The non-transitory storage medium as recited in claim 1, wherein the operations further comprise storing, at the cloud storage site, the hash in association with the data.

8. The non-transitory storage medium as recited in claim 1, wherein authentication of the hash establishes that the data stored at the cloud storage site is the same as data that is represented by another hash that is stored at the notary service.

9. The non-transitory storage medium as recited in claim 1, wherein the function is performed by a watch service that is running at the cloud storage site.

10. The non-transitory storage medium as recited in claim 1, wherein the hash transmitted to the notary service enables a user to query the notary service to determine if the data exists and the object that includes the data has been signed with the digital signature.

11. The non-transitory storage medium as recited in claim 1, wherein the object further comprises a second unique identifier and a second digital signature, and the second unique identifier and second digital signature correspond to a second cloud storage site different from a first cloud storage site to which the digital signature and the unique identifier correspond.

12. A method, comprising:
 detecting, at a cloud storage site, storage of data at the cloud storage site;
 in response to the detecting of the storage of the data, invoking, at the cloud storage site, a function that operates at the cloud storage site by:
  accessing the data;
  generating and adding, to the data, a header that comprises a globally unique identifier of the data;
  creating a hash by hashing a combination that comprises the globally unique identifier and the data;
  transmitting the hash to a notary service;
  when the hash is authenticated by the notary service, receiving, from the notary service, a digital signature that corresponds to the hash; and
  appending the digital signature to the data; and
 storing at the cloud storage site, as an object, a combination that comprises the digital signature, the data, and the globally unique identifier.

13. The method as recited in claim 12, wherein when the hash is not authenticated by the notary service, the function receives a message from the notary service indicating that the hash is not authenticated.

14. The method as recited in claim 12, wherein the digital signature is based on the hash and a private key.

15. The method as recited in claim 12, wherein the function is invoked automatically in response to the detecting of the storage of the data at the cloud storage site.

16. The method as recited in claim 12, wherein the operations further comprise storing, at the cloud storage site, the hash in association with the data.

17. The method as recited in claim 12, wherein authentication of the hash establishes that the data stored at the cloud storage site is the same as data that is represented by another hash that is stored at the notary service.

18. The method as recited in claim 12, wherein the function is performed by a watch service that is running at the cloud storage site.

19. The method as recited in claim 12, wherein the hash transmitted to the notary service enables a user to query the notary service to determine if the data exists and the object that includes the data has been signed with the digital signature.

20. The method as recited in claim 12, wherein the object further comprises a second unique identifier and a second digital signature, and the second unique identifier and second digital signature correspond to a second cloud storage site different from a first cloud storage site to which the digital signature and the unique identifier correspond.

* * * * *